(12) United States Patent
Rozman et al.

(10) Patent No.: US 8,941,341 B2
(45) Date of Patent: Jan. 27, 2015

(54) ROTATING DIODE ASSEMBLY INCLUDING OVERVOLTAGE PROTECTION CIRCUIT

(71) Applicant: Hamilton Sundstrand Corporation, Windsor Locks, CT (US)

(72) Inventors: Gregory I. Rozman, Rockford, IL (US); Jacek F. Gieras, Glastonbury, CT (US); Steven J. Moss, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 128 days.

(21) Appl. No.: 13/828,384

(22) Filed: Mar. 14, 2013

(65) Prior Publication Data

US 2014/0268431 A1   Sep. 18, 2014

(51) Int. Cl.
  *H02P 6/16*   (2006.01)
  *H02H 7/10*   (2006.01)
  *H02H 7/06*   (2006.01)

(52) U.S. Cl.
  CPC .............. *H02H 7/103* (2013.01); *H02H 7/065* (2013.01)
  USPC ............ 318/400.33; 318/400.32; 318/400.34; 318/400.36

(58) Field of Classification Search
  CPC ...................................................... H02P 6/185
  USPC .............. 318/400.33, 400.32, 400.34, 400.36
  See application file for complete search history.

(56) References Cited

U.S. PATENT DOCUMENTS

| | | | |
|---|---|---|---|
| 3,210,603 A | 10/1965 | Calfee et al. | |
| 3,371,235 A | 2/1968 | Hoover | |
| 3,534,228 A | 10/1970 | Hyvarinen et al. | |
| 3,705,331 A | 12/1972 | South et al. | |
| 3,852,628 A | 12/1974 | Spisak et al. | |
| 4,161,668 A | 7/1979 | Schmohe et al. | |
| 4,329,603 A | 5/1982 | Ballard | |
| 4,486,801 A | 12/1984 | Jackovich et al. | |
| 4,528,493 A | 7/1985 | Spencer et al. | |
| 4,559,486 A | 12/1985 | Spencer et al. | |
| 4,628,219 A | 12/1986 | Troscinski | |
| 4,827,165 A | 5/1989 | Nold | |
| 4,959,707 A | 9/1990 | Pinchott | |
| 5,006,741 A | 4/1991 | Schott | |
| 5,013,948 A | 5/1991 | Tumpey et al. | |
| 5,453,901 A | 9/1995 | Lackey | |
| 6,998,726 B2 * | 2/2006 | Sarlioglu et al. | 290/31 |
| 8,058,851 B2 * | 11/2011 | Petkov | 322/68 |

\* cited by examiner

*Primary Examiner* — David S Luo
(74) *Attorney, Agent, or Firm* — Cantor Colburn LLP

(57) ABSTRACT

A brushless wound field synchronous generator configured to generate an output power to drive an electrical load includes a rotating rectifier assembly. The rotating rectifier assembly includes a rotating diode assembly and a field effect transistor (FET) to control voltage across the rotating diode assembly.

12 Claims, 3 Drawing Sheets

US 8,941,341 B2

ROTATING DIODE ASSEMBLY INCLUDING OVERVOLTAGE PROTECTION CIRCUIT

BACKGROUND

The present inventive teachings relate generally to a brushless wound field synchronous generator, and more particularly, an overvoltage protection circuit of a rotating diode assembly included in a wound field synchronous generator.

Brushless wound field synchronous generator systems may utilize start inverters to electrically excite the main armature winding during initial engine start. Conventional wound field synchronous generator systems may include a rotating diode assembly, which is traditionally subject to overvoltage stress caused by voltage spikes generated by the start inverter during the engine start. Voltage spikes on the main armature windings may be realized on the rotating diodes. Over time, the overvoltage stress may result in failure of the rotating diode assembly.

In addition, flowing oil that streams past solid surfaces, for example during rotor operation, in the generator may induce an electrostatic charge accumulation (ECA) phenomena. The ECA may build in the rotating diode assembly, thereby resulting in electrostatic discharge (ESD) and causing failure of one or more diodes included in the rotating diode assembly.

BRIEF DESCRIPTION

According to an embodiment of the present inventive teachings, a brushless wound field synchronous generator configured to generate an output power to drive an electrical load and comprises a rotating rectifier assembly. The rotating rectifier assembly includes a rotating diode assembly and a field effect transistor (FET) to control voltage across the rotating diode assembly.

In another embodiment, a rotating rectifier comprises a rotating diode assembly and a field effect transistor (FET) to control voltage potential realized across the voltage rectifier circuit in response to the voltage potential exceeding a predetermined threshold voltage level.

BRIEF DESCRIPTION OF THE DRAWINGS

The subject matter which is regarded as the inventive teachings is particularly pointed out and distinctly claimed in the claims at the conclusion of the specification. The foregoing and other features of the inventive teachings are apparent from the following detailed description taken in conjunction with the accompanying drawings in which:

DETAILED DESCRIPTION

Figure 1A:
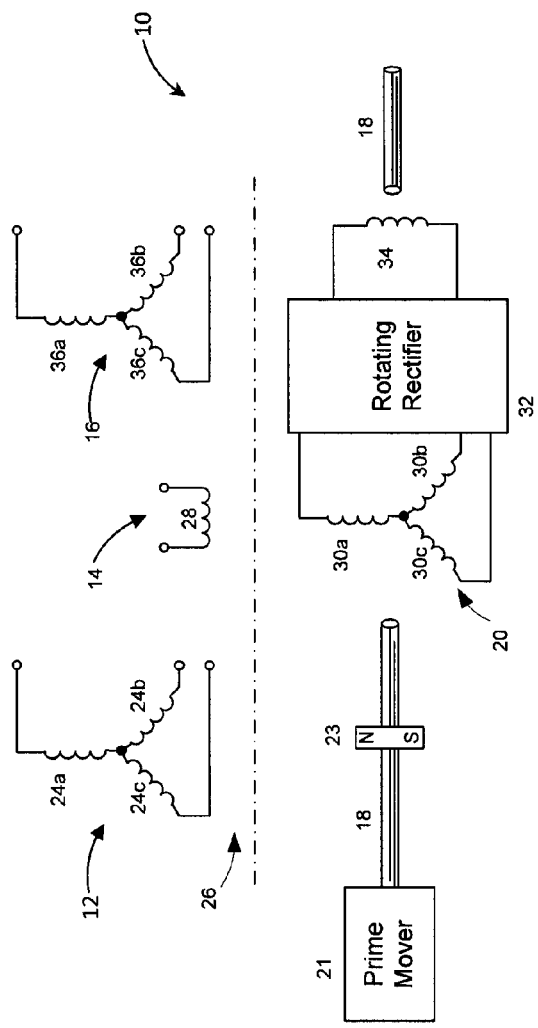
FIG. 1A illustrates a schematic diagram of a brushless synchronous generator according to an embodiment.
Figure 1B:
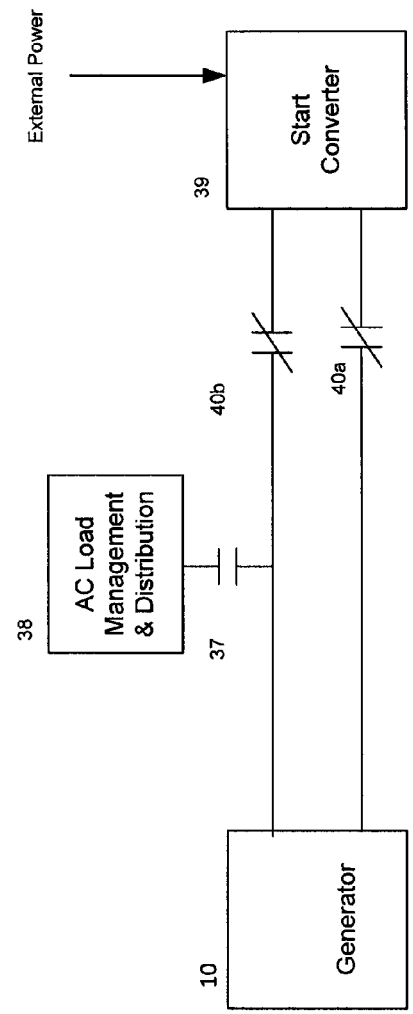
FIG. 1B illustrates a block diagram of an electric power system together with a start converter.

Referring now to FIGS. 1A-1B, a brushless wound field synchronous generator 10 includes a permanent magnet generator (PMG) 12, an exciter portion 14 and a main generator portion 16. The generator 10 further includes a motive power shaft 18 interconnecting a rotor 20 of the generator 10 and a prime mover 21, such as a gas turbine engine.

The rotor 20 carries one or more magnets 23 which form poles for interacting with the PMG 12. Rotation of the motive power shaft 18 causes relative movement between the magnetic flux produced by the permanent magnet 23 and a set of three-phase PMG armature windings 24a-24c mounted within a stator 26 of the generator 10.

The exciter portion 14 includes a field winding 28 disposed at the stator 26 and a set of three-phase armature windings 30a-30c disposed on the rotor 20. A rotating rectifier 32 interconnects the exciter armature windings 30a-30c and a main generator portion field winding 34 also disposed on the rotor 20. Three-phase main generator portion armature windings 36a-36c are disposed at the stator 26.

During operation in a generating mode, PMG armature windings 24a-24c are coupled through a rectifier and voltage regulator (not shown) to the exciter portion field winding 28. As the motive power shaft 18 is rotated, power produced in the PMG armature win dings 24a-24c is rectified, regulated and delivered to the field winding 28. AC power is produced in the armature windings 30a-30c, rectified by the rotating rectifier 32 and applied to the main generator portion field winding 34. Rotation of the motive power shaft 18 and the field winding 34 induces three-phase AC voltages in the main generator portion armature windings 36a-36c as is conventional. As seen in FIG. 1B, the AC voltages are supplied through a contactor set 37 to AC load management and distribution unit 38.

Often, it is desirable to use the brushless generator 10 as a motor to bring the prime mover 21 up to self-sustaining speed. This operation is accomplished by providing electrical AC power to the main generator portion armature windings 36a-36c and suitably commutating the currents flowing in the windings 36a-36c to cause the motive power shaft 18 to rotate. The electrical power for the generator 10 is deployed by a start converter 39 which receives external power and which is connected by contactor sets 40a, 40b to the exciter field winding 28 and the armature windings 36a-36c, respectively.

Figure 2:
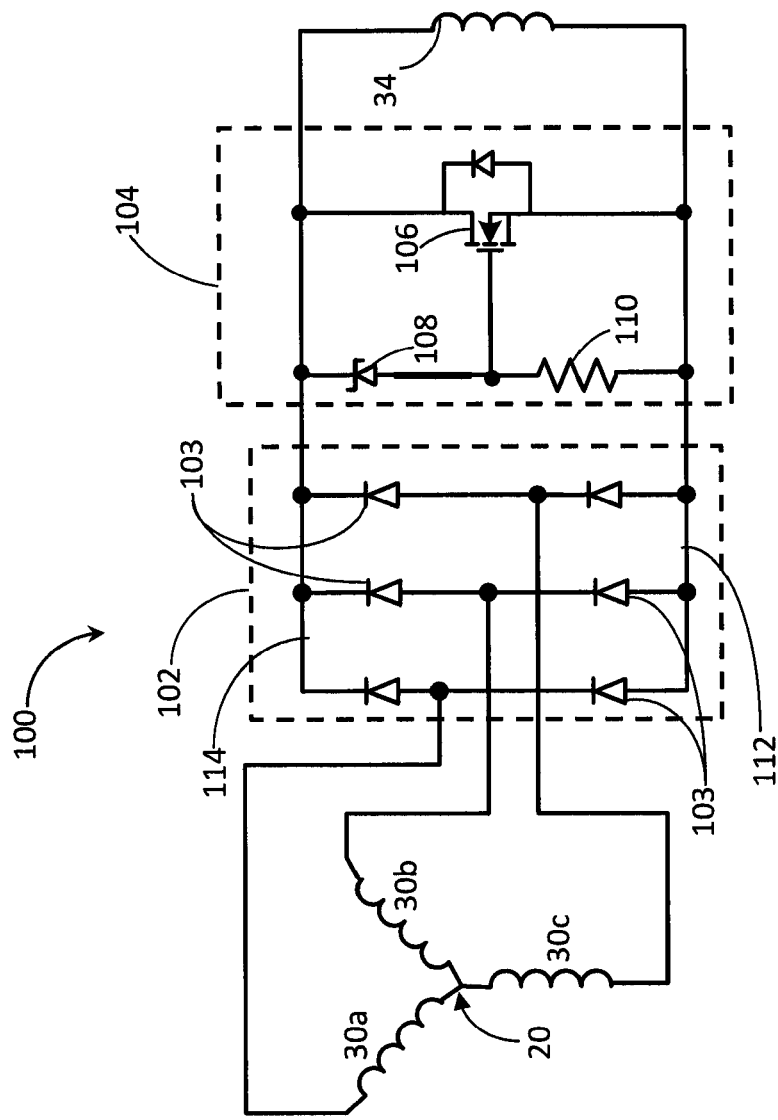
FIG. 2 is a schematic diagram of a rotating rectifier assembly including a rotating diode assembly according to an embodiment.

Referring now to FIG. 2, a schematic diagram of a rotating rectifier assembly 100 including a rotating diode assembly 102 is illustrated according to an embodiment. The rotating rectifier assembly 102 includes an over-voltage protection circuit 104 to protect the rotating diode assembly 102 during an over-voltage event. The over-voltage protection circuit 104 comprises a field effect transistor (FET) 106 and a voltage detection circuit including a zener diode 108 and a reference resistor 110. The anode of the zener diode 108 coupled to the gate of the FET 106 and a first end of the resistor 110. The second end of the resistor 110 is in electrical communication with the negative rails 112 of the rotating diode assembly 102. In at least one embodiment, the FET 106 is a silicon carbide (SiC) FET (MOSFET) to control voltage across the rotating diode assembly and effectively dissipate power when activated. In one embodiment, the SiC FET 106 is configured to operate at high temperatures ranging from approximately 200 degrees Celsius to approximately 300 degrees Celsius, for example, and high operating voltages such as, for example approximately 900 volts (V) to approximately 1020 V.

More specifically, the FET 106 is connected in parallel with the rotating diode assembly 102, and is activated when the voltage level across the rotating diode arrangement 102 (i.e., across the negative rail 112 and a positive rail 114 of the rotating diode arrangement 102) exceeds a predetermined threshold voltage level. The threshold voltage level may range from approximately 200 V to approximately 300 V. In the illustrated embodiment, a zener diode 108 may tolerate high temperature. In more detail, a cathode of the zener diode 108 is connected to a positive rail 114 of the rotating diode assembly 102 and an anode of the zener diode 108 is connected to the gate of the SiC MOSFET 106. Accordingly, the zener diode 108 does not conduct current therethrough during normal operating conditions, i.e., when no over-voltage event occurs and SiC MOSFET 106 is in turned-off condition When an over-voltage event occurs, however, a voltage across the resistor 110 due current conducted therethrough is realized at the gate of the SiC MOSFET 106 (i.e., the gate voltage. In response to the gate voltage, the SiC MOSFET 106 is activated such that current is shunted through the source-drain terminals to protect excessive current/voltage from damaging the rotating diode assembly 102. To limit excessive current from flowing through the SiC MOSFET 106, a current limiting resistor may be connected in series with a source of the SiC MOSFET 106.

Figure 3:
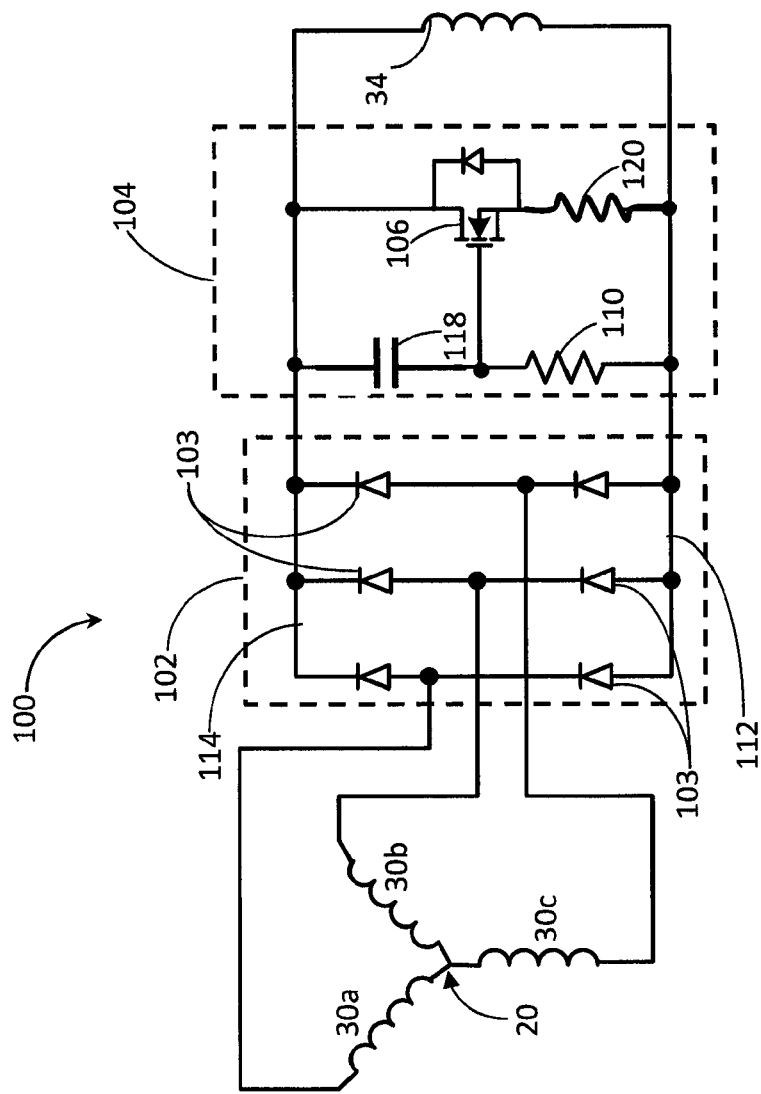
FIG. 3 is a schematic diagram of a rotating rectifier assembly including a rotating diode assembly according to another embodiment.

Referring now to FIG. 3, a schematic diagram of a rotating rectifier assembly 100 including a rotating diode assembly 102 is illustrated according to another embodiment. The diode assembly includes one or more diodes 103 to generate a rectified voltage. Similar to the rotating rectifier assembly 100, an over-voltage protection circuit 104 is provided to protect the rotating diode assembly 102 from damage during an over-voltage event. In this embodiment, the over-voltage protection circuit 104 includes a capacitor 118. One end of the capacitor 118 is connected to a positive rail 114 of the rotating diode assembly 102 and the opposite end of the capacitor is connected to the gate of the SiC MOSFET 106. Accordingly, the capacitor is configured to detect an excessive voltage realized across the rotating diode assembly 102. During the over-voltage event, the voltage across the capacitor is realized by the gate of the SiC MOSFET 106. In response to the gate voltage, the SiC MOSFET 106 is activated such that current is shunted through the source-drain terminals to protect excessive current/voltage from damaging the rotating diode assembly 102. To limit excessive current from flowing through the SiC MOSFET 106, a current limiting resistor 120 may be connected between a source of the SiC MOSFET 106 and the negative rail 112 of the rotating diode assembly 102.

Accordingly, at least one embodiment of the present inventive teachings discussed above provides a SiC MOSFET that effectively controls the voltage realized by a rotating diode rectifying assembly during an over-voltage event. The SiC MOSFET is configured to operate at high temperatures and high operating voltages, while effectively dissipating excessive power on the DC rectifier bus during an over-voltage event.

While the present inventive teachings have been described in detail in connection with only a limited number of embodiments, it should be readily understood that the present inventive teachings are not limited to such disclosed embodiments. Rather, the inventive teachings may be modified to incorporate any number of variations, alterations, substitutions or equivalent arrangements not heretofore described, but which are commensurate with the spirit and scope of the invention. Additionally, while various embodiments of the present inventive teachings have been described, it is to be understood that features of the inventive teachings may include only some of the described embodiments. Accordingly, the inventive teachings are not to be seen as limited by the foregoing description.

The invention claimed is:

1. A brushless wound field synchronous generator configured to generate an output power to drive an electrical load, the wound field synchronous generator comprising:

a main generator portion with an armature winding and a field winding rotatable with respect to the armature winding and an exciter portion, the exciter portion including a field winding and an armature winding rotatable with respect to the field winding; and a rotating rectifier assembly disposed between the exciter portion of a rotating armature winding and a main generator portion rotating field winding, the rotating rectifier assembly configured to generate a direct current (DC) voltage to provide the DC voltage to the main generator portion rotating field winding, the rotating rectifier assembly including a rotating diode assembly and a field effect transistor (FET) to control voltage across the rotating diode assembly.

2. The brushless wound field synchronous generator of claim 1, wherein the FET is a silicon carbide (SiC) FET (MOSFET).

3. The brushless wound field synchronous generator of claim 2, wherein the MOSFET is connected in parallel with the rotating diode assembly.

4. The brushless wound field synchronous generator of claim 3, wherein the MOSFET is activated in response to a voltage level across the rotating diode assembly exceeding a predetermined voltage threshold.

5. The brushless wound field synchronous generator of claim 4, wherein the rotating diode assembly includes at least one zener diode in electrical communication with a gate of the MOSFET.

6. The brushless wound field synchronous generator of claim 4, wherein the rotating diode assembly includes a capacitor having a first end connected to a positive rail of the rotating diode assembly and a second end connected to a gate of the MOSFET.

7. A rotating rectifier assembly, comprising:

a rotating diode assembly including a plurality of diodes to form a voltage rectifier circuit configured to generate a direct current (DC); and a field effect transistor (FET) to control voltage potential realized across the voltage rectifier circuit in response to the voltage potential exceeding a predetermined threshold voltage level.

8. The brushless wound field synchronous generator of claim 7, wherein the FET is a silicon carbide (SiC) FET (MOSFET).

9. The brushless wound field synchronous generator of claim 8, wherein the MOSFET is connected in parallel with the voltage rectifier circuit.

10. The brushless wound field synchronous generator of claim 9, wherein the MOSFET is activated in response to a voltage level across the voltage rectifier circuit exceeding the predetermined voltage threshold level.

11. The brushless wound field synchronous generator of claim 10, wherein the rotating diode assembly includes at least one zener diode in electrical communication with a gate of the MOSFET.

12. The brushless wound field synchronous generator of claim 10, wherein the rotating diode assembly includes a capacitor having a first end connected to a positive rail of the rotating diode assembly and a second end connected to a gate of the MOSFET.

* * * * *